United States Patent
Chan et al.

(10) Patent No.: US 8,271,544 B2
(45) Date of Patent: Sep. 18, 2012

(54) DATA FILE HAVING MORE THAN ONE MODE OF OPERATION

(75) Inventors: Wei Luen Chan, Singapore (SG);
Fransiscus Jonas Salim, Singapore (SG); Teck Chee Lee, Singapore (SG)

(73) Assignee: Creative Technology Ltd, Singapore (SG)

( * ) Notice: Subject to any disclaimer, the term of this patent is extended or adjusted under 35 U.S.C. 154(b) by 319 days.

(21) Appl. No.: 12/434,587

(22) Filed: May 1, 2009

(65) Prior Publication Data
US 2010/0281070 A1 Nov. 4, 2010

(51) Int. Cl.
*G06F 17/30* (2006.01)
(52) U.S. Cl. ......................................... 707/803
(58) Field of Classification Search ............... 707/2, 102, 707/104.1, 803; 715/817
See application file for complete search history.

(56) References Cited

U.S. PATENT DOCUMENTS

| | | | |
|---|---|---|---|
| 7,271,832 B1 | 9/2007 | Parulski et al. | |
| 7,921,287 B2* | 4/2011 | Sprigg et al. ............ | 713/165 |
| 2005/0046699 A1* | 3/2005 | Oya et al. ................ | 348/207.1 |
| 2005/0256984 A1* | 11/2005 | Jenkins et al. .............. | 710/100 |
| 2007/0100865 A1* | 5/2007 | King et al. .................. | 707/102 |
| 2008/0055683 A1* | 3/2008 | Choe et al. .................. | 358/525 |
| 2008/0095425 A1 | 4/2008 | Franklin et al. | |
| 2009/0077129 A1* | 3/2009 | Blose ........................ | 707/104.1 |
| 2009/0089709 A1* | 4/2009 | Baier et al. .................. | 715/817 |
| 2010/0110108 A1* | 5/2010 | Alexandersson et al. ..... | 345/660 |

* cited by examiner

*Primary Examiner* — Etienne LeRoux
(74) *Attorney, Agent, or Firm* — Creative Technology Ltd (57) ABSTRACT

A data file having more than one modes of operation. The data file comprises an image component for storing an image as a representation of the data file and one or more data components appended to the image component. The image component comprises metadata associated with the one or more data components. In a first mode of operation, the image component of the data file is readable for viewing the image by an image viewer while the image component is part of the data file. The one or more appended data components are unreadable by the image viewer in the first mode of operation. In a second mode of operation, the image component and the one or more appended data components are readable by a file reader.

23 Claims, 9 Drawing Sheets

DATA FILE HAVING MORE THAN ONE MODE OF OPERATION

FIELD OF INVENTION

The present invention relates to a data file having more than one modes of operation, in particular, relating to data files for storing images, text, audio and/or video content.

BACKGROUND

Conventionally, each photograph taken by a digital camera is stored as an image file. Typically, the image file is in the JPEG File format.

At times, different file formats of the same image are required for different uses. For example, a photography competition may require a JPEG-compressed image for viewing and assessment, and require the same image in Tagged Image File Format (TIFF) for printing. Also, sometimes the uncompressed raw image with full resolution that is generated by the camera upon taking a photograph may be required. For computer graphics, the images may have two separate files, a raster version for viewing and a vector version for more precise reproduction at higher resolution. It is observed that when there are numerous files of different formats representing the same image, file management can be troublesome as many files are involved.

File management of image files of related images may also be troublesome. For instance, in High Dynamic Range photography, there may be a few related photographs that are taken with different exposure rates. In Panorama photography, there may be a few related photographs to be stitched up to form a panorama image.

A need therefore exists to provide a data file that addresses at least the above-mentioned problems.

SUMMARY

In accordance with one aspect of the present invention, there is provided a data file having more than one mode of operation, the data file comprising: an image component for storing an image as a representation of the data file; and one or more data components appended to the image component, the image component comprising metadata associated with the one or more data components, wherein in a first mode of operation, the image component of the data file being readable for viewing the image by an image viewer while the image component is part of the data file, the one or more appended data components being unreadable by the image viewer in the first mode of operation, and in a second mode of operation, the image component and the one or more appended data components being readable by a file reader.

The image component may be based on JPEG file format, GIF (GIF89a version) file format, TIFF file format or PNG file format and is viewable by a corresponding image viewer.

The data file may further comprise an application segment, the application segment comprising: a Signature field for containing a signature to distinguish the application segment from other application segments that is present in the image component.

The application segment may further comprise a version field for indicating version of technical standard applicable to the application segment.

The data file may further comprise a content checker for verifying data integrity of the one or more data components.

The metadata may comprise one or more tags, each tag comprising: a tag type identifier for indicating type of the tag; and a tag name field may comprise text data describing the type of the tag.

The one or more data components may be image data, text data, audio data or video data.

Each data component may comprise data of difference between data of the image stored in the image component and original data of the data component.

Each data component may comprise data of difference between original data of two of the one or more data components.

One or more of the data components may comprise data of the history of changes made to the image stored in the image component.

The image may be a stitched Panorama photograph and the one or more data components may comprise pre-stitched snapshots of different portions of the stitched Panorama photograph.

The image may be a generated HDR photograph and the one or more data components may comprise photographs taken with different exposure rates that are used for generating the HDR photograph.

The image may be a rasterised image and the one or more data components may comprise vector graphics information.

The image for storing as the representation of the data file may be user selectable.

The metadata may comprise metadata associated with the image component.

In accordance with a second aspect of the present invention, there is provided a method for creating a data file having more than one modes of operation, the method comprising: selecting an image; storing the selected image as a representation of the data file in an image component of the data file; creating metadata associated with the one or more data components; incorporating the metadata into the image component; and appending one or more data components to the image component incorporating the metadata to form the data file, wherein in a first mode of operation of the data file, the image component being readable for viewing the selected image by an image viewer while the image component is part of the data file, in a second mode of operation of the data file, the image component and the one or more appended data components being readable by a file reader.

The image component may be based on JPEG file format, GIF (GIF89a version) file format, TIFF file format or PNG file format and is readable by a corresponding file reader.

The step of storing the selected image as a representation of the data file in an image component of the data file may comprise creating an image file as the image component of the data file from the selected image.

The step of incorporating the metadata into the image component may comprise reading data in the image file for placing before the metadata and writing the read data for placing before the metadata to a new file; reading data in the image file for placing after the metadata and writing the read data for placing after the metadata to the new file; and incorporating the constructed metadata into the new file.

The step of storing the selected image as a representation of the data file in an image component of the data file may comprise creating an image file with an allocated data space as the image component of the data file from the selected image.

The step of incorporating the metadata into the image component may comprise inserting the metadata into the allocated data space of the image file.

In accordance with a third aspect of the present invention, there is provided a method for reading a data file having more than one modes of operation, the data file comprising: an image component for storing an image as a representation of the data file; and one or more data components appended to the image component, the image component comprising metadata associated with the one or more data components, the method comprising: in a first mode of operation, reading the image component to view the image stored in the image component of the data file, the one or more appended data components being unreadable in the first mode of operation; and in a second mode of operation, reading the image component or one or more of the appended data components of the data file, the image component and the one or more appended data components being readable in the second mode of operation.

BRIEF DESCRIPTION OF THE DRAWINGS

Embodiments of the invention will be better understood and readily apparent to one of ordinary skill in the art from the following written description, by way of example only and in conjunction with the drawings, in which.

DETAILED DESCRIPTION

Figure 1:
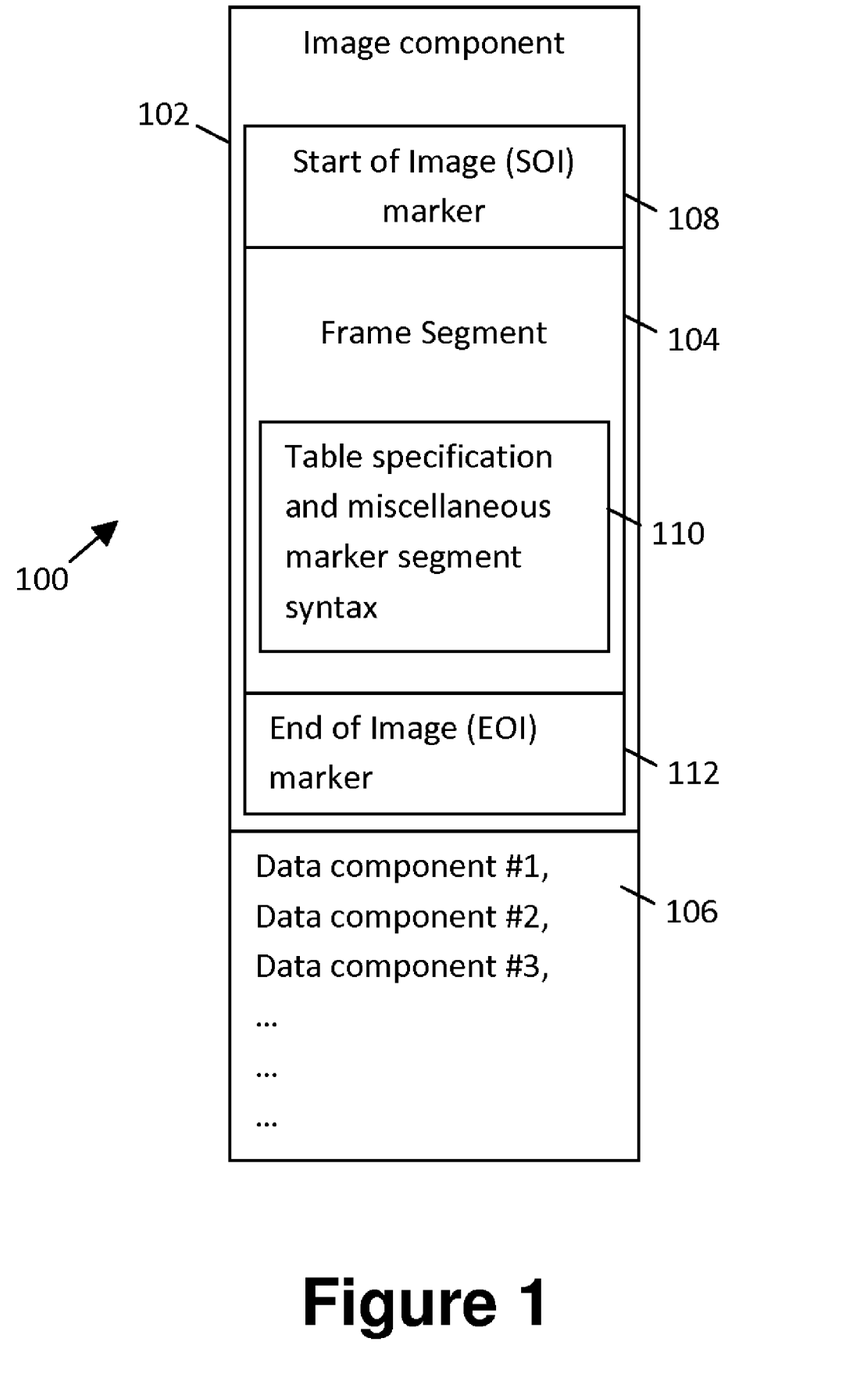
FIG. 1 shows a block diagram of the components of an example embodiment of the present invention.

With reference to FIG. 1, there is provided a data file 100 according to an example embodiment of the present invention. The data file 100 has more than one modes of operation. The data file includes an image component 102 for storing an image 104 as a representation of the data file 100. One or more data components 106 are appended to the image component 102. The image component 102 includes metadata associated with the one or more data components 106 appended to the image component 102. In a first mode of operation, the image component 102 of the data file 100 is readable for viewing the image 104 by an image viewer while the image component 102 is part of the data file 100. The one or more appended data components 106 are unreadable by the image viewer in the first mode of operation. In a second mode of operation, the image component 102 and the one or more appended data components 106 are readable by a file reader. The one or more data components 106 could be image data, text data, audio data or video data. Also, the image could be selected by a user via appropriate software. It is appreciated that in another example embodiment, the aforementioned metadata could include metadata associated with the image component 102.

In the example embodiment, the image component 102 is based on the JPEG file format, which is a common image file format that can be readily read by JPEG image viewers installed in most electronic devices, such as personal computers, laptop computers, mobile phones, personal digital assistants, and the like.

Advantageously, in the first mode of operation of the data file 100, the image component 102 could be read from the data file 100 using a conventional JPEG image viewer (i.e. an image viewer) without having to remove the one or more appended data components (106 in FIG. 1) or manipulate the data file 100. As conventional JPEG image viewers are not capable of reading the one or more appended data components 106, the one or more appended data components 106 are unreadable by it. In a second mode of operation of the data file 100, the image component 102 and the one or more appended data components 106 in the data file 100 could be read using proprietary software that is capable of discerning the syntax of the data file 100. It is appreciated that other example embodiments could include other modes of operation. For instance, some of the data components 106 but not all are readable by the appropriate software and the image component 102 may or may not be readable by this software.

The syntax of the data file 100 includes a Start of Image (SOI) marker 108, a Frame segment 104, an End of Image (EOI) marker 112 and the appended one or more data components 106.

According to the JPEG standard (reference: JPEG ISO/IEC 10918-1 ITU-T Recommendation T.81) and an extension of it, i.e. the JFIF specification [reference: HAMILTON (E.), JPEG File Interchange Format Version 1.02, C-Cube Microsystems, 1992], amongst other JPEG syntaxes, the Frame segment 104 includes a table specification and miscellaneous marker segment syntax 110. The table specification and miscellaneous marker segment syntax 110 may include Quantization table-specification syntax, Huffman table-specification syntax, Arithmetic conditioning table-specification syntax, Restart interval definition syntax, Comment syntax, Application data syntax, and Define number of lines syntax.

Under the Application data syntax, which contains $APP_n$ (Application) segments reserved for application use, there is provided in the example embodiment an application segment (hereinafter "$APP_9$ segment") (200 in FIG. 2) for containing metadata associated with the one or more data components 106. It is appreciated that in other embodiments, $APP_1$, $APP_2$, $APP_3$, and so on could also be used to contain the metadata.

Figure 2:
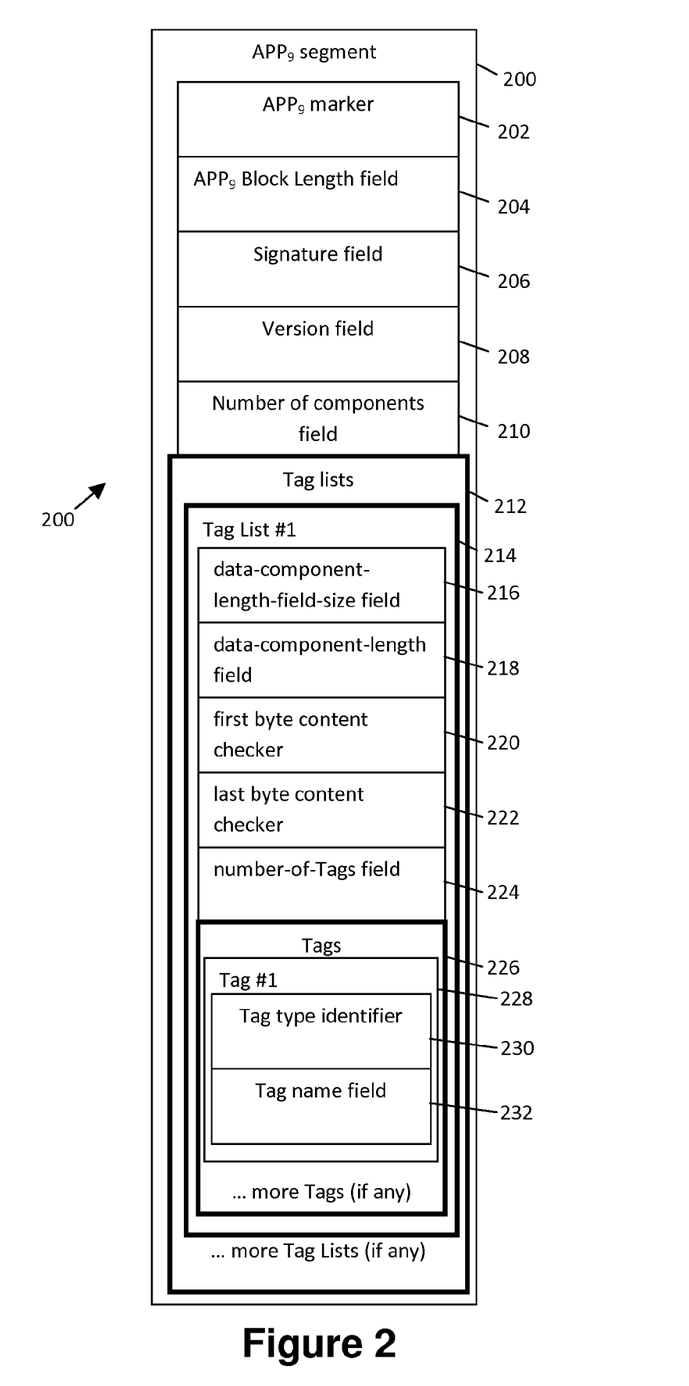
FIG. 2 shows a block diagram of the components of an example embodiment of the present invention.

With reference to FIG. 2, the $APP_9$ segment 200 includes in sequential order an $APP_9$ marker 202 (size: 16 bits) for indicating the beginning of the $APP_9$ segment 200, an $APP_9$ Block Length field 204 (size: 16 bits) for indicating the size of the $APP_9$ segment 200 in number of Bytes, and a Signature field 206 (size: 32 bits) for containing a signature to distinguish the $APP_9$ segment 200 of the embodiment from other $APP_9$ segments that may be present and used for other purposes. Following the Signature field 206 is a Version field 208 (size: 16 bits) for indicating the version of the proprietary technical standard applicable to the $APP_9$ segment 200, a Number of components field 210 (size: 16 bits) for indicating the number of data components (106 in FIG. 1) appended to, i.e. concatenated to one after another in series, the end of the image component 102 (i.e. after the EOI marker 112), and one or more tag lists 212 (size: variable) associated with the appended one or more data components (106 in FIG. 1). It is appreciated that in another example embodiment, one or more of the tag lists 212 may be associated with the image component (102 in FIG. 1) in addition to the tag lists 212 solely for the one or more appended data components (106 in FIG. 1).

Furthermore, it is appreciated that in another example embodiment, the one or more data components (106 in FIG. 1) may be appended to the front of the image component 102 (i.e. before the SOI marker 108). Compared to having the one or more data components (106 in FIG. 1) located within the image component, appending the one or more data components (106 in FIG. 1) externally to the image component (102 in FIG. 1) advantageously reduces complexity in the software used to make changes to the data components (106 in FIG. 1), create the data file (100 in FIG. 1) and extract one or more of the data components from the data file (100 in FIG. 1). It is easier and involves lesser steps to split the image component (102 in FIG. 1) from the data components (106 in FIG. 1) when the one or more data components (106 in FIG. 1) are appended to the image component (102 in FIG. 1). Moreover, since null or zero characters are often used in a file as terminators for a particular data block, if the data components (106 in FIG. 1) are located within the image component (102 in FIG. 1), it may become necessary to replace certain data having a null or zero character with another character so as to distinguish those data from the terminators. In the example embodiment, the data components (106 in FIG. 1) could be appended to the image component (102 in FIG. 1) in its original form without any need to replace null or zero characters.

In the example embodiment, a tag list 214 (Tag List #1 in FIG. 2) in the one or more tag lists 212 includes a data-component-length-field-size field 216 (size: 8 bits) for indicating the number of bytes of the data-component-length field 218. The data-component-length field 218 indicates the actual size of the data component (106 in FIG. 1) associated with the tag list 214 and has a variable size in bytes that is dependent on the number of bytes specified in the data-component-length-field-size field 216. The tag list 214 further includes a first byte content checker 220 (8 bits) used for verifying the data integrity of the first byte of the data component (106 in FIG. 1) associated with the tag list 214. The tag list 214 also includes a last byte content checker 222 (8 bits) used for verifying the data integrity of the last byte of the data component (106 in FIG. 1) associated with the tag list 214. Furthermore, there is provided, in the tag list 214, a number-of-Tags field 224 (size: 16 bits) for indicating the number of tags for the data component (106 in FIG. 1) associated with the tag list 214.

There are one or more tags 226 in the tag list 214. A tag 228 (Tag #1 in FIG. 2) of the one or more tags includes a Tag type identifier 230 (size: 32 bits) for indicating the type of the tag 228. The tag 228 further includes a Tag name field 232 with a variable size and ends with a '\0' (i.e. null) character. The Tag name field 232 is associated with the Tag type identifier 230 and consists of text data describing the type of the tag 228. For example, the Tag type identifier 230 could contain '0000' in hexadecimal numbers and this refers to text data "Regular Still Photograph" in the Tag name field 232. Another example is the Tag type identifier 230 could contain '0001' in hexadecimal numbers and this refers to text data "Recorded Audio" in the Tag name field 232. In the example embodiment, a fraction (e.g. 50%) of the hexadecimal numbers available for the Tag type identifier 230 is reserved for users to define their own Tag type identifier 230. The rest of the hexadecimal numbers available for the Tag type identifier 230 could be reserved for predefined use. The one or more tags 226 advantageously provide information on the data component (106 in FIG. 1) they are associated with.

The steps to create the data file 100 described with reference to FIG. 1 are described as follow with reference to FIG. 3. In the example embodiment, these steps can be carried out by executing a file creation application of the example embodiment on a processing unit. The processing unit may be a desktop computer, a mobile phone, a personal digital assistant, a laptop computer, a camera, and the like.

At step 302, create an image file, i.e. a JPEG file in this embodiment, for an image selected by user using the file creation application. The JPEG file will form the image component (102 in FIG. 1). It is noted that in the first mode of operation of the data file (100 in FIG. 1), the image component (102 in FIG. 1) is readable for viewing the image contained therein by an image viewer (i.e. a JPEG image viewer in this case) while the image component (102 in FIG. 1) is part of the data file (100 in FIG. 1). It is appreciated that in another example embodiment, the file creation application may be configured to have the option to automatically select the image without requiring the user to make the selection.

At step 304, read the part (i.e. data) of the created JPEG file that is to be placed before the $APP_9$ segment (200 in FIG. 2) and write the read portion in a new file.

At step 306, construct the $APP_9$ segment (200 in FIG. 2) with information derived from the one or more data components (106 in FIG. 1) and append the $APP_9$ segment (200 in FIG. 2) to the new file created at step 304.

At step 308, read the part (i.e. data) of the JPEG file that is to be placed after the $APP_9$ segment (200 in FIG. 2) and append the read portion to the new file that has undergone step 306.

At step 310, append the one or more data components (106 in FIG. 1) right after the End of Image marker (112 in FIG. 1) of the new file that has undergone step 308. The data file (100 in FIG. 1) of the example embodiment is thus created at step 310.

Figure 3:
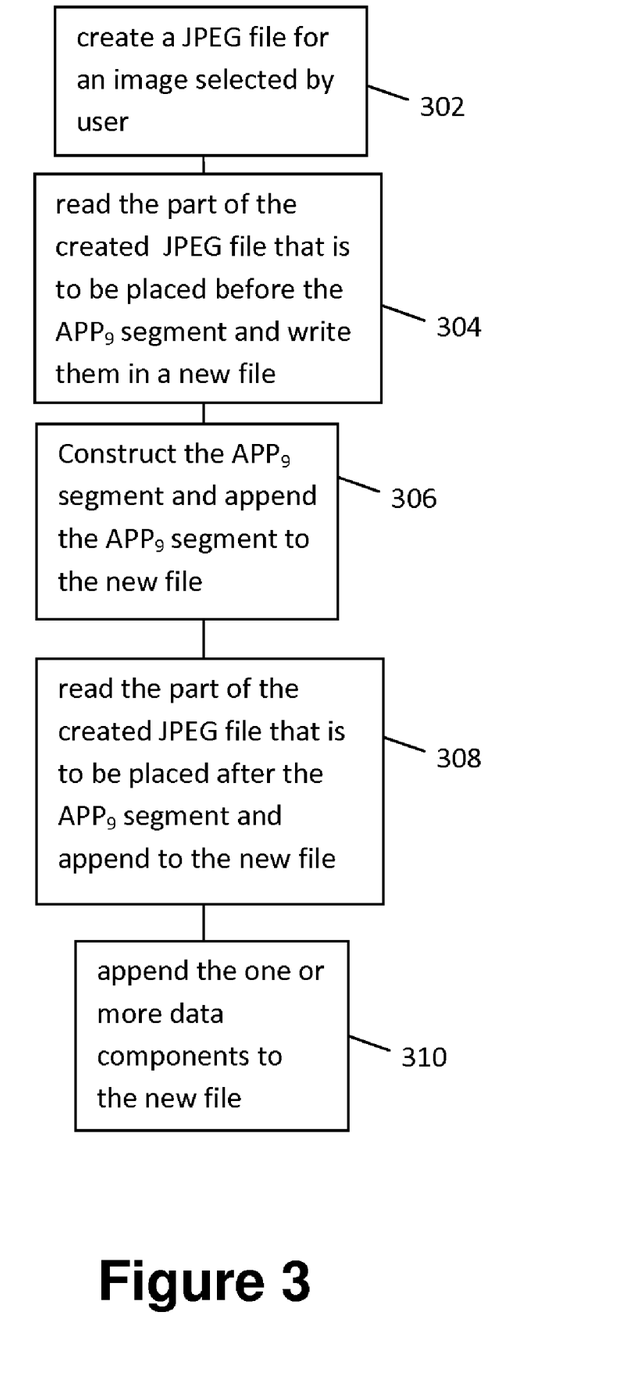
FIG. 3 shows a flowchart of an example embodiment of the present invention.
Figure 4:
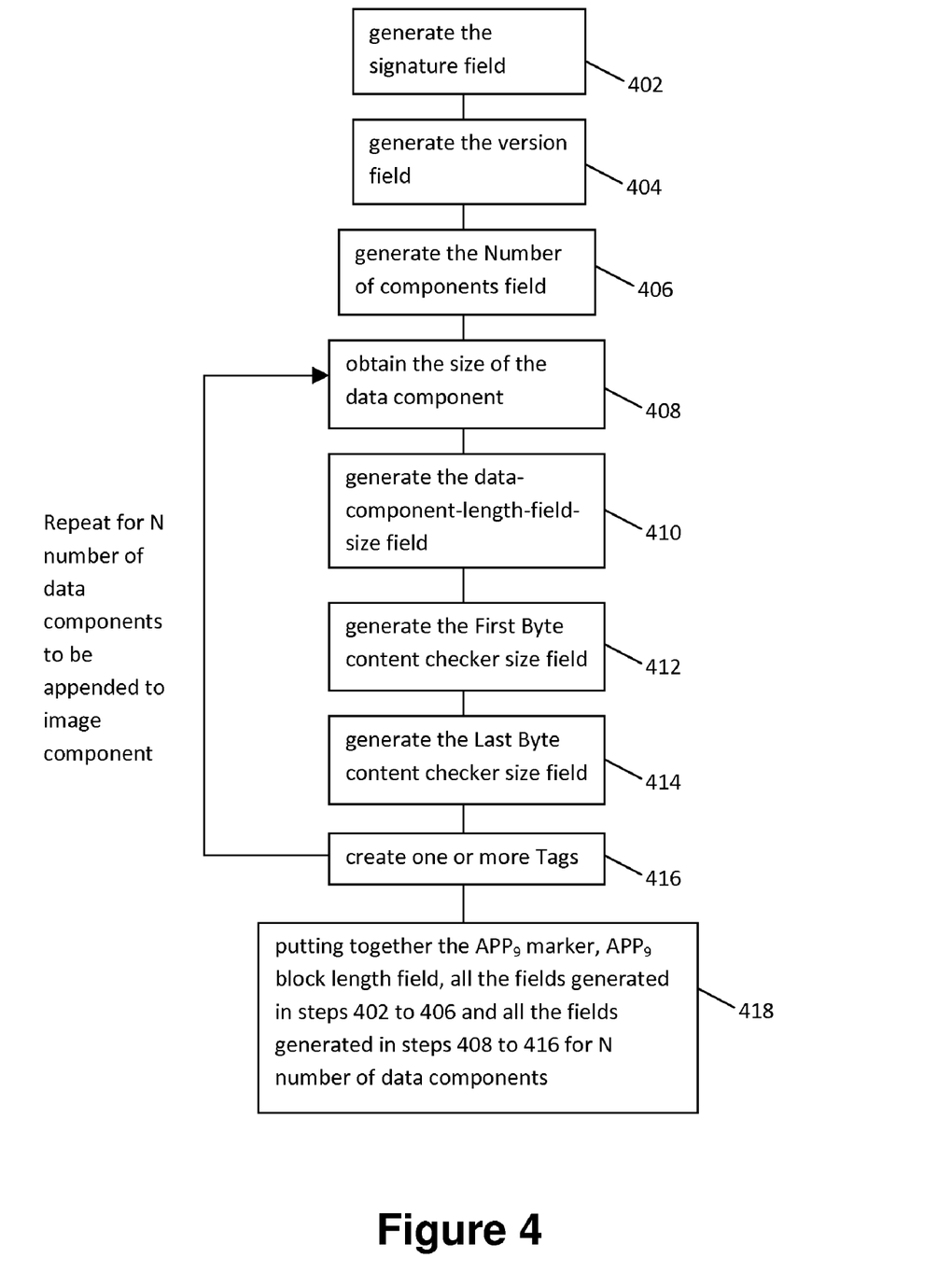
FIG. 4 shows a flowchart of an example embodiment of the present invention.

With reference to FIG. 4, the steps to construct the $APP_9$ segment (200 in FIG. 2) at step 308 as described with reference to FIG. 3 are as follow. Similarly, these steps can be carried out by executing the file creation application.

At step 402, generate the Signature field (206 in FIG. 2) using a predefined signature.

At step 404, generate the Version field (208 in FIG. 2) using a predefined version number.

At step 406, count the number of data components (106 in FIG. 1) selected by user for appending to the image component (102 in FIG. 1), include the image component (102 in FIG. 1) in the count, and generate the Number of components field (210 in FIG. 2) based on the count. For example, if there is only one data component (106 in FIG. 1), the number of components field (210 in FIG. 2) including the image component would be 2.

At step 408, obtain the size of each of the data components (106 in FIG. 1) to generate the data-component-length field (218 in FIG. 2) for the Tag list (214 in FIG. 2) of each data component (106 in FIG. 1).

At step 410, calculate the data component length field size using the size of each of the data components (106 in FIG. 1) to generate the data-component-length-field-size field (216 in FIG. 2).

At step 412, retrieve the first byte of each data component (106 in FIG. 1) to generate the First Byte content checker (220 in FIG. 2) of each data component (106 in FIG. 1). The First Byte content checker (220 in FIG. 2) contains the first byte's value.

At step 414, retrieve the last byte of each data component (106 in FIG. 1) to generate the Last Byte content checker (222 in FIG. 2) of each data component (106 in FIG. 1). The Last Byte content checker (222 in FIG. 2) contains the last byte's value.

At step 416, allow user to create one or more Tags (226 in FIG. 2) for each data component (106 in FIG. 1) by, firstly, assigning a predefined Tag type identifier (230 in FIG. 2) for identifying a type of the tag (226 in FIG. 2) and, secondly, creating the Tag name field (232 in FIG. 2) including text data for describing the type of the tag (226 in FIG. 2). The Tag name field (232 in FIG. 2) would be appended with a '\0' (i.e. null) character to represent the end of the tag (226 in FIG. 2).

Repeat steps 408 to 416 for N number of data components to be appended to the image component (102 in FIG. 1). It is appreciated that in another example embodiment, one or more Tags (226 in FIG. 2) associated with the image component could also be created for incorporating into the APP9 segment (200 in FIG. 2).

At step 418, put together the APP$_9$ marker, APP$_9$ block length field, all the fields generated in steps 402 to 406 and all the fields generated in steps 408 to 416 for N number of data components to form the APP9 segment (200 in FIG. 2).

Figure 5:
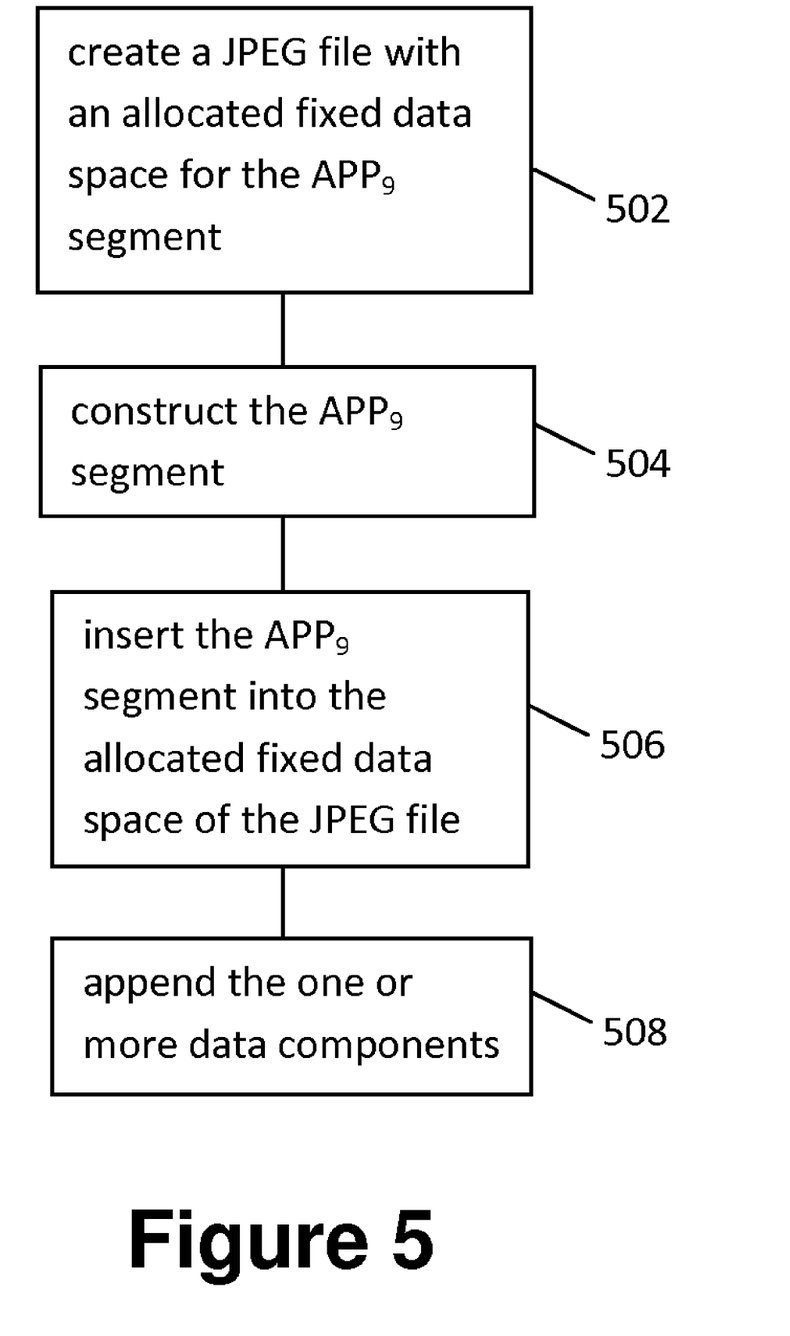
FIG. 5 shows a flowchart of an example embodiment of the present invention.

In another example embodiment, the steps to create the data file 100 described with reference to FIG. 1 are described as follow with reference to FIG. 5.

At step 502, create an image file, i.e. a JPEG file in this embodiment, with an allocated data space for the APP$_9$ segment (200 in FIG. 2). The JPEG file contains an image selected by the user. The image may need to be converted from other file formats into JPEG format if it is not initially in JPEG file format for this example embodiment. It is appreciated that in another example embodiment, the file creation application may be configured to have the option to automatically select the image without requiring the user to make the selection.

At step 504, construct the APP$_9$ segment (200 in FIG. 2) by going through steps 402 to 418 as described with reference to FIG. 4.

At step 506, insert the APP$_9$ segment (200 in FIG. 2) into the allocated data space of the JPEG file that was created.

At step 508, append the one or more data components (106 in FIG. 1) right after the End of Image marker (112 in FIG. 1) of the JPEG file incorporating the constructed APP$_9$ segment (200 in FIG. 2). The data file (100 in FIG. 1) of the example embodiment is thus created after step 508.

Figure 6:
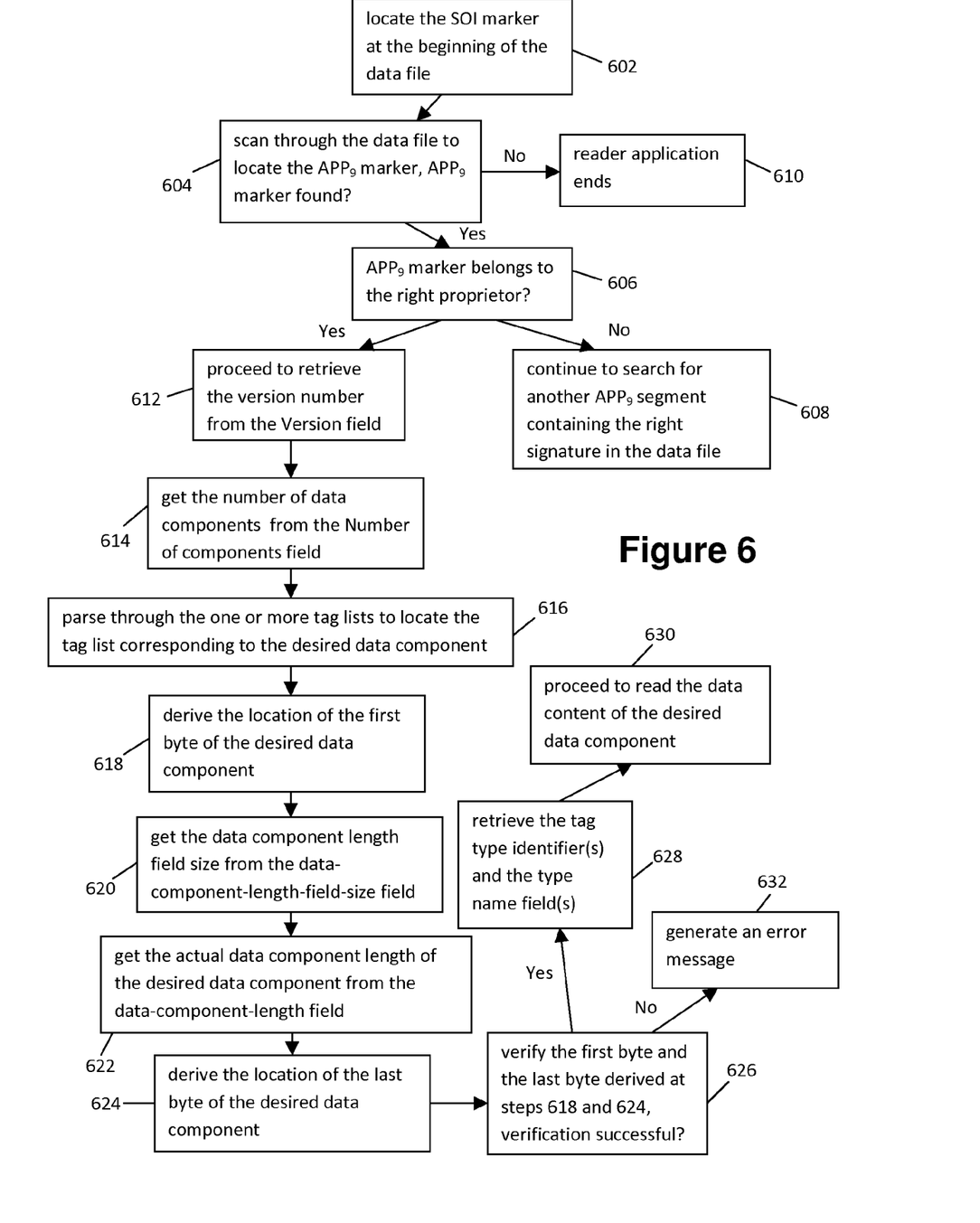
FIG. 6 shows a flowchart of an example embodiment of the present invention.

The following steps described with reference to FIG. 6 could be taken to read the contents of a data component (106 in FIG. 1) appended to the data file (100 in FIG. 1). These steps illustrate the second mode of operation of the data file (100 in FIG. 1). These steps can be carried out by executing a file reader application of the example embodiment on the processing unit described earlier.

At step 602, after receiving user request to read the contents of a specific data component (106 in FIG. 1) in the data file (100 in FIG. 1), look for the data file (100 in FIG. 1) in a file storage device containing the data file (100 in FIG. 1) based on the entered user request. In the example embodiment, the user request is obtained from user input to the file reader application. User inputs for the filename of the data file (100 in FIG. 1) and for the specific data component could be filenames of the data component, which are in the form of text strings. Once the data file (100 in FIG. 1) is located, proceed to locate the SOI marker (108 in FIG. 1) at the beginning of the data file (100 in FIG. 1). It is appreciated that the file reader application could be configured to display a list of all the complete data components (106 in FIG. 1), which it can recognise, when it parses the data file (100 in FIG. 1), user input in this case could be simply selecting one of the listings in the list.

After the SOI marker (108 in FIG. 1) of the data file (100 in FIG. 1) is located, scan through the data file (100 in FIG. 1) to locate the APP$_9$ marker (202 in FIG. 2) at step 604.

After the APP$_9$ marker (202 in FIG. 2) is located, at step 606, check the signature in the Signature field (206 in FIG. 2) of the APP$_9$ segment (200 in FIG. 2) by comparing it with a predetermined signature to verify whether the presently located APP$_9$ segment (200 in FIG. 2) belongs to the right proprietor.

If the signature authentication is unsuccessful, continue to search for another APP$_9$ segment containing the right signature in the data file at step 608.

If no APP$_9$ segment (200 in FIG. 2) containing the right signature is found, the file reader application ends at step 610.

If the signature authentication is successful, proceed to retrieve the version number from the Version field (208 in FIG. 2) and perform subsequent operations according to the version of the software indicated by the version number at step 612.

The following steps 614 to 630 are carried out in accordance with the version of the software determined at step 612.

After the version number is retrieved at step 612, get the number of data components (106 in FIG. 1) from the Number of components field (210 in FIG. 2) at step 614.

At step 616, parse through the one or more tag lists (212 in FIG. 2) to locate the tag list (214 in FIG. 2) of the desired data component (106 in FIG. 1) that the user requested. The tag list (214 in FIG. 2) of the desired data component (106 in FIG. 1) is located once the desired data component index in the user request is found in the tag list (214 in FIG. 2). While parsing, all the data component lengths indicated in the data-component-length field (218 in FIG. 2) of the one or more tag lists (212 in FIG. 2) that are parsed through are extracted and accumulated. Only the data component lengths in the data-component-length field (218 in FIG. 2) of the tag lists before the tag list of the desired data component (106 in FIG. 1) are accumulated.

At step 618, derive the location of the first byte of the desired data component (106 in FIG. 1) using the data of the accumulated data component lengths obtained at step 616.

At step 620, get the data component length field size from the data-component-length-field-size field 216 in the tag list of the desired data component (106 in FIG. 1). This would determine the number of bytes in the data-component-length field (218 in FIG. 2).

At step 622, get the actual data component length of the desired data component (106 in FIG. 1) from the data-component-length field (218 in FIG. 2).

At step 624, derive the location of the last byte of the desired data component (106 in FIG. 1) based on the actual data component length obtained at step 622.

At step 626, verify the first byte and the last byte derived at steps 618 and 624 respectively with the First Byte content checker (220 in FIG. 2) and the Last Byte content checker (222 in FIG. 2).

If one or both of the derived first and last bytes are different from the checkers (220 and 222 in FIG. 2 respectively), the file reader application generates an error message at step 632.

If the first and last bytes verified at step 626 are the same as the checkers (220 and 222 in FIG. 2 respectively), proceed to retrieve the tag type identifier (230 in FIG. 2) and the type name field (232 in FIG. 2) information of the desired data component (106 in FIG. 1) for further application usage at step 628. For instance, if the tag names in the tag name fields (232 in FIG. 2) are required to be displayed in the user interface of the file reader application, the tag names are retrieved.

At step 630, position the file pointer at the first byte location and proceed to read the data content of the desired data component (106 in FIG. 1).

With regard to the steps for reading the image component (102 in FIG. 1) to view the image in the image component (102 in FIG. 1) under the first mode of operation of the data file (100 in FIG. 1), these steps are similar to the steps taken to read a typical JPEG file using a conventional JPEG image viewer. It is noted that conventional JPEG image viewers are not capable of reading the appended data components (106 in FIG. 1).

Figure 7:
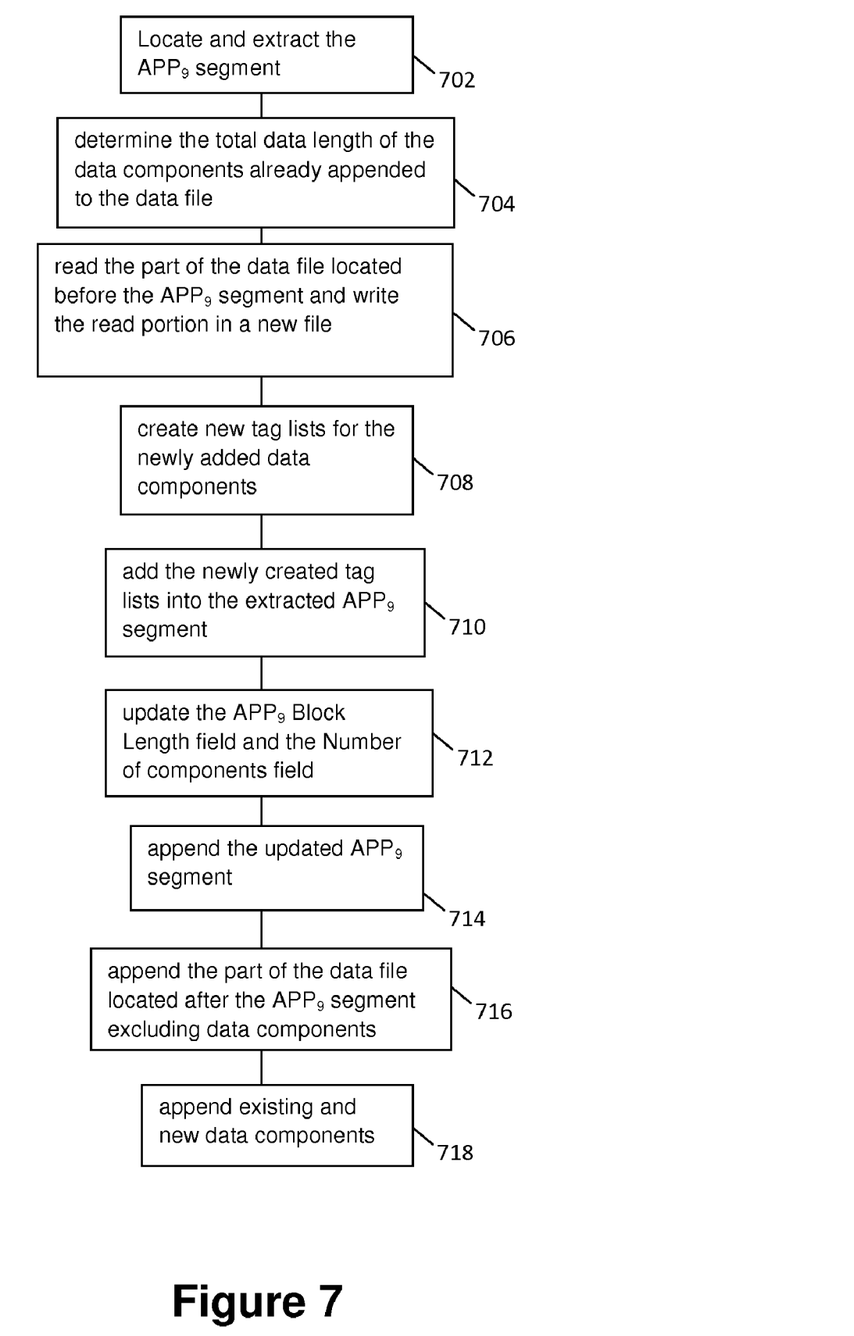
FIG. 7 shows a flowchart of an example embodiment of the present invention.

FIG. 7 illustrates addition/insertion of data component(s) (106 in FIG. 1). The steps in FIG. 7 can be carried out by executing a file editing application of the example embodiment on the processing unit described earlier.

At step 702, locate and extract the APP$_9$ segment (200 in FIG. 2) of the data file (100 in FIG. 1).

At step 704, determine the total data length of the data components (106 in FIG. 1) already appended to the data file (100 in FIG. 1) by accumulating the values of all the data component length fields found in the one or more tag lists (212 in FIG. 2) of the APP$_9$ segment (200 in FIG. 2).

At step 706, read the part (i.e. data) of the data file (100 in FIG. 1) located before the APP$_9$ segment (200 in FIG. 2) and write the read portion in a new file.

At step 708, create new tag lists for the newly added data components (106 in FIG. 1).

At step 710, add the newly created tag lists corresponding to the newly added data components to the APP$_9$ segment (200 in FIG. 2).

At step 712, update the APP$_9$ Block Length field 204 with the new size of the APP$_9$ segment 200 and update the Number of components field 210 with the new number of data components (106 in FIG. 1) appended to the data file (100 in FIG. 1).

At step 714, append the updated APP$_9$ segment (200 in FIG. 2) to the new file.

At step 716, read the part (i.e. data) of the data file (100 in FIG. 1) located after the APP$_9$ segment (200 in FIG. 2) excluding data components (106 in FIG. 1) and append the read portion to the new file.

At step 718, append to the new file the existing data components including one or more new data components (106 in FIG. 1) in an order selected by the user. It is appreciated that the file editing application may include a user interface allowing the user to select the order for appending existing and new data components.

The new file created through steps 702 to 718 would be the new data file (100 in FIG. 1) with the added/inserted data component(s).

Figure 8:
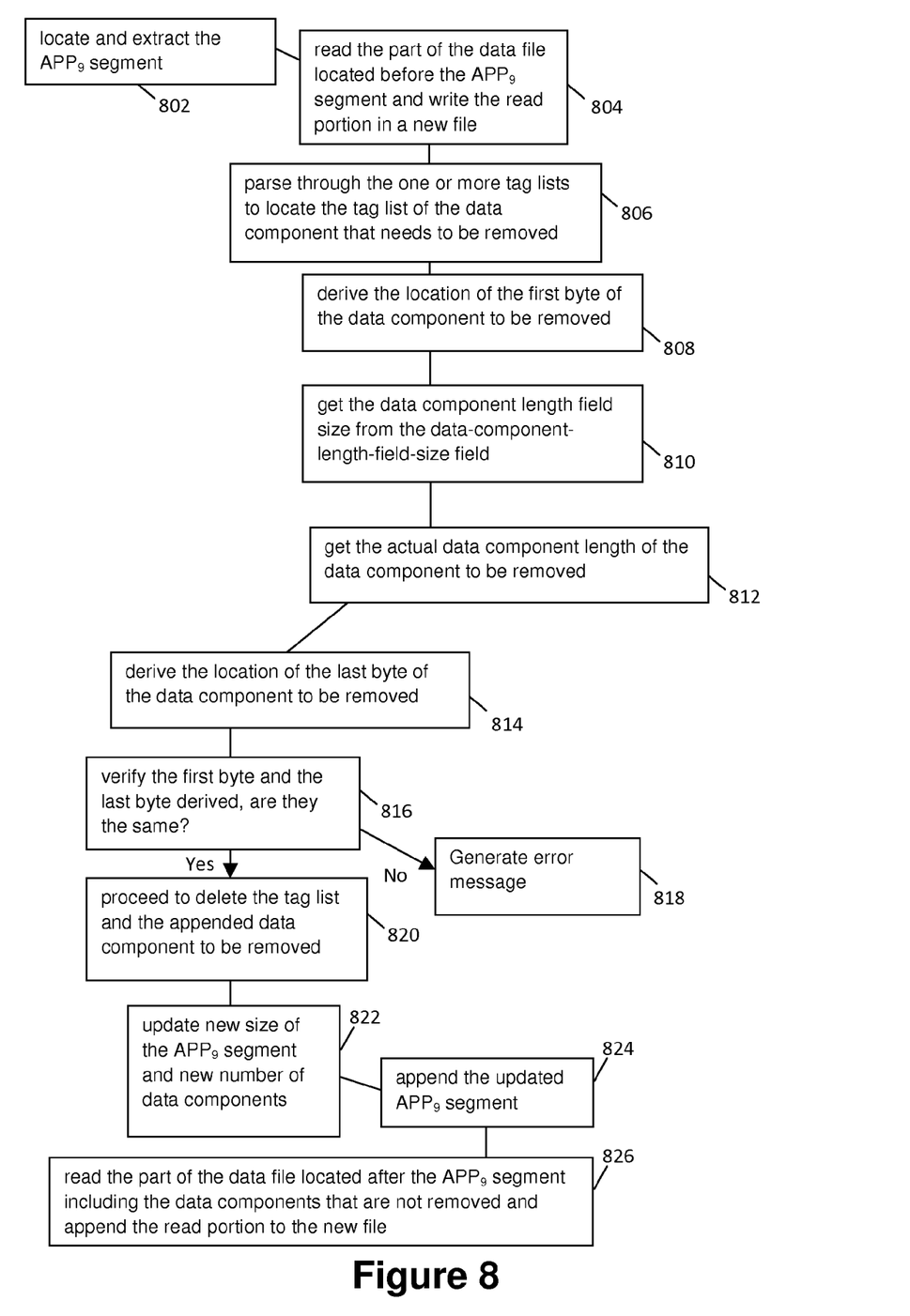
FIG. 8 shows a flowchart of an example embodiment of the present invention.

With regard to removing one or more data components (106 in FIG. 1) from the data file (100 in FIG. 1), the steps are described as follow with reference to FIG. 8. These steps can be carried out by executing the previously mentioned file editing application.

At step 802, locate and extract the APP$_9$ segment (200 in FIG. 2) of the data file (100 in FIG. 1).

At step 804, read the part (i.e. data) of the data file (100 in FIG. 1) located before the APP$_9$ segment (200 in FIG. 2) and write the read portion in a new file.

At step 806, parse through the one or more tag lists (212 in FIG. 2) to locate the tag list (214 in FIG. 2) of the data component (106 in FIG. 1) that needs to be removed. While parsing, all the data component lengths indicated in the data-component-length field (218 in FIG. 2) of the one or more tag lists (212 in FIG. 2) that are parsed through are extracted and accumulated. Only the data component lengths in the data-component-length field (218 in FIG. 2) of the tag lists before the tag list of the desired data component (106 in FIG. 1) are accumulated.

At step 808, derive the location of the first byte of the data component (106 in FIG. 1) to be removed using the data of the accumulated data component lengths obtained at step 808.

At step 810, get the data component length field size from the data-component-length-field-size field 216 in the tag list of the data component (106 in FIG. 1) to be removed. This would determine the number of bytes in the data-component-length field (218 in FIG. 2).

At step 812, get the actual data component length of the data component (106 in FIG. 1) to be removed from the data-component-length field (218 in FIG. 2).

At step 814, derive the location of the last byte of the data component (106 in FIG. 1) to be removed using the actual data component length obtained at step 812.

At step 816, verify the first byte and the last byte derived at steps 808 and 814 respectively with the First Byte content checker (220 in FIG. 2) and the Last Byte content checker (222 in FIG. 2) in the tag list (214 in FIG. 2) of the data component (106 in FIG. 1) to be removed.

If one or both of the derived first and last bytes are different from the checkers (220 and 222 in FIG. 2 respectively), the file editing application generates an error message at step 818.

If the first and last bytes verified at step 816 are the same as the checkers (220 and 222 in FIG. 2 respectively), proceed to delete the tag list (214 in FIG. 2) of the appended data component (106 in FIG. 1) to be removed at step 820.

At step 822, update the APP$_9$ Block Length field (204 in FIG. 2) to indicate the new size of the APP$_9$ segment (200 in FIG. 2) and the Number of components field (210 in FIG. 2) to indicate the new number of data components (106 in FIG. 1) appended to the data file (100 in FIG. 1).

At step 824, append the updated APP$_9$ segment (200 in FIG. 2) to the new file At step 826, read the part (i.e. data) of the data file (100 in FIG. 1) located after the APP$_9$ segment (200 in FIG. 2) including the data components (106 in FIG. 1) that are not removed and append the read portion to the new file.

The new file created through steps 802 to 826 would be the new data file (100 in FIG. 1) with the selected data component (s) removed.

Figure 9:
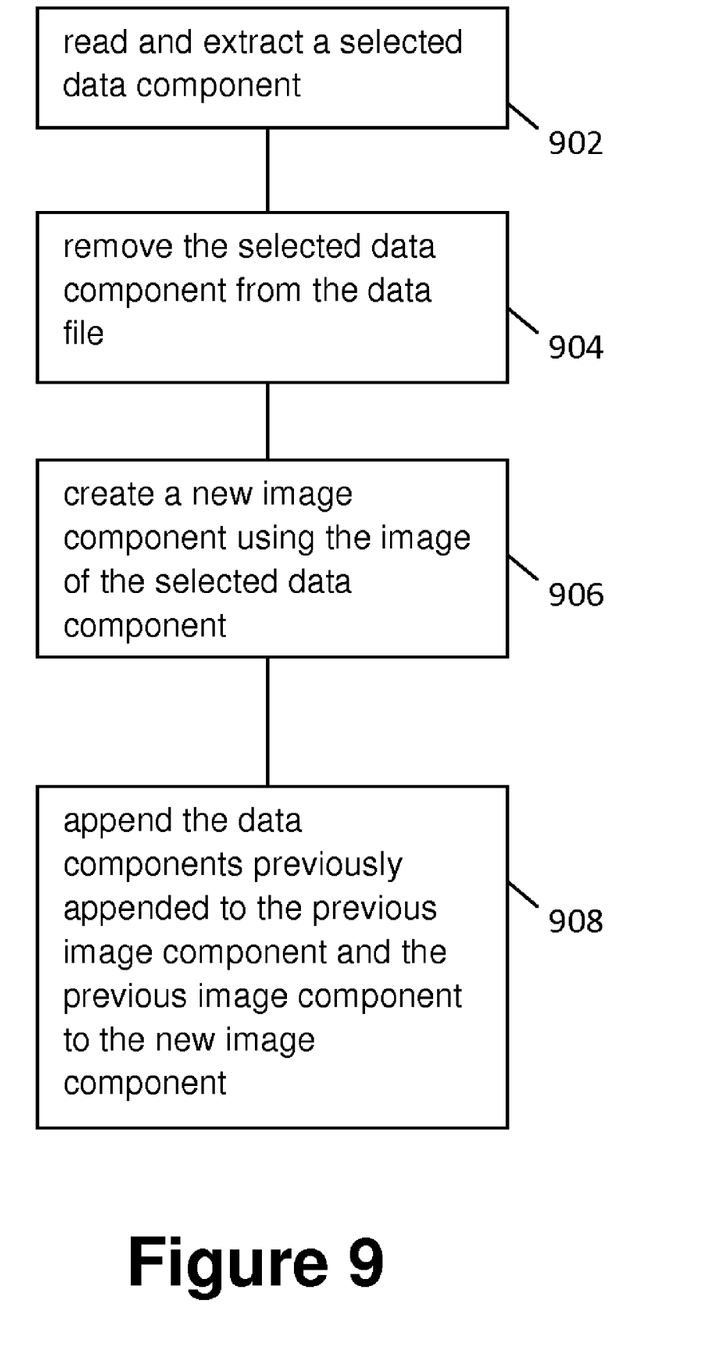
FIG. 9 shows a flowchart of an example embodiment of the present invention.

The steps described as follow with reference to FIG. 9 are for re-ordering the image component (102 in FIG. 1) and the data component(s) (106 in FIG. 1) in the data file (100 in FIG. 1). Specifically, the image in the image component (102 in FIG. 1) is exchanged with another image, which is a data component (106 in FIG. 1). These steps can be carried out by executing the previously mentioned file editing application.

At step 902, read and then extract a selected data component (106 in FIG. 1) containing the image to be exchanged with the image in the image component (102 in FIG. 1). Reading of the selected data component (106 in FIG. 1) can be performed for instance by applying the steps described with reference to FIG. 6.

At step 904, remove the selected data component (106 in FIG. 1) from the data file (100 in FIG. 1). Removing of the selected data component can be performed for instance by applying the steps described with reference to FIG. 8.

At step 906, create a new image component using the image of the selected data component.

At step 908, append the data components (106 in FIG. 1) previously appended to the previous image component (102 in FIG. 1) and the previous image component (102 in FIG. 1) to the new image component to form a new re-ordered data file (100 in FIG. 1).

Various uses of the data file (100 in FIG. 1) are described as follow.

The data file (100 in FIG. 1) of the example embodiment is capable of storing image files of different formats pertaining to the same image within a single file and displaying one of the image files as a representation of the image. File management becomes much easier as all the related image files are all stored in one single file.

For instance, the data file (100 in FIG. 1) of the example embodiment could be used to store multiple photographs that are related and varies from each other only due to framing, different angles and/or other photographic considerations. The best photograph shot could be selected by the user to be the image of the image component (102 in FIG. 1), which can be displayed by common image viewers and file browsers as the image component 102 is in the popular JPEG format, while the rest of the shots could be stored as data components (106 in FIG. 1) for recording purposes in case there could be future use for them.

Another photography based application of the data file (100 in FIG. 1) of the example embodiment is to display a stitched Panorama photograph in the image component (102 in FIG. 1) and append all the pre-stitched snapshots of different portions of the stitched Panorama photograph as data components (106 in FIG. 1) to the image component (102 in FIG. 1). If one needs to work on the pre-stitched snapshots, they are conveniently located in the same file displaying the stitched panorama photograph.

The data file (100 in FIG. 1) of the example embodiment could be similarly used for storing High Dynamic Range (HDR) photographs. That is, select the generated HDR photograph as the image in the image component (102 in FIG. 1) and append the photographs taken with different exposure rates that are used for generating the HDR photograph as data components (106 in FIG. 1) to the image component (102 in FIG. 1).

The data file (100 in FIG. 1) could also be used to store multiple resolutions of the same image, including versions with and without copyright imprint. For instance, in a typical image purchasing website, there are provided images of different sizes being showcased. The purchasing options of the website allow customers to buy image sizes S, M, L, XL with/without copyright imprint at different prices. Conventionally, it is likely that a "sample" folder would be created for storing the images to be showcased on the website, a "copyrighted" folder would be created for storing the copyright imprinted versions of the images, and a "non-copyrighted" folder would be created for storing the versions of the images without copyright imprint. Furthermore, for better classification and file tidiness, under the "copyrighted" and "non-copyrighted" folders, the following sub-folders could be created: S, M, L, XL and the images of the corresponding size would be stored accordingly in each of these sub-folders. If for instance, there is a change of file name for one image file, all the files of the same image in the sub-folders have to be renamed one by one. This is very prone to errors and troublesome. If the data file (100 in FIG. 1) of the example embodiment is used, it is appreciated that only one folder is required. The sample image could be the image in the image component (102 in FIG. 1) and the images in the different sizes having copyright imprint or not could be appended as data components (106 in FIG. 1) to the image component (102 in FIG. 1). In this case, any change of file name only requires changing the file name of one data file.

Quite often, multiple formats of the same image are required. For example, in the case of a photography competition, a JPEG image may be requested for the short-listing process and a TIFF image may be requested for printing. It is advantageous to use the data file (100 in FIG. 1) of the example embodiment to store the JPEG image in the image component (102 in FIG. 1) for display and to store the TIFF image as a data component (106 in FIG. 1).

Another application of the data file (100 in FIG. 1) of the example embodiment is to display an updated or finished technical design drawing in the image component (102 in FIG. 1) and append all the working files of the technical design as data components (106 in FIG. 1) to the image component (102 in FIG. 1). If one needs to work on the working files, the files would be conveniently located in the same file displaying the updated or finished technical design drawing.

Furthermore, it is observed that most file formats for storing technical design drawings do not show up as thumbnails in the file explorer of the operating system (OS) (e.g. Windows OS). If the data file (100 in FIG. 1) of the example embodiment is used, most file explorers (almost all support JPEG files) could display the thumbnail of the technical design drawing due to the JPEG compatible image component (102 in FIG. 1). Also, advantageously, the original image file (in any format) of the subject technical drawing can be appended "as is" (i.e. unmodified) to the image component (102 in FIG. 1) and could be readily accessible by a file reader application described with reference to FIG. 6.

Another useful feature of the data file (100 in FIG. 1) of the example embodiment is its ability to indicate meaningful information that could explain the link between the image component (102 in FIG. 1) and the data components (106 in FIG. 1) by making use of the Tags (226 in FIG. 2). The Tags (226 in FIG. 2) can indicate the kind of information contained in the data component(s). For example, a data component (106 in FIG. 1) storing an audio data with Tags "mp3", "recorded in studio", "male solo" will indicate that this audio data is in mp3 format, is recorded in a studio instead of in the outdoors, and the main audio content is that of a male singer singing solo.

Traditionally, rasterised images and their corresponding vector graphics information are stored separately and file management can be difficult when there are a large number of images involved. A solution to this problem is to use the data file (100 in FIG. 1) of the example embodiment to store a JPEG-compressed raster image as the image in the image component (102 in FIG. 1) and the vector graphics information as data components (106 in FIG. 1). In this way, the number of files that need to be stored and managed would be greatly reduced.

It is appreciated that the data file (100 in FIG. 1) of the example embodiment could be further used for storing a subject image in the image component (102 in FIG. 1) for display and for storing data of the history of changes made to the subject image as data components (106 in FIG. 1). For example, the subject image could be a rasterised image and the undo history could be vector graphics information. In this case, through an appropriate application, it is possible to undo the changes made to the subject image based on data residing as data components (106 in FIG. 1) in the data file (102 in FIG. 1). This is a very useful feature because the undo history stays with the subject image. In contrast, traditionally, undo history data is cached temporarily by most applications and would be erased once the application ends.

Another application of the data file (100 in FIG. 1) of the example embodiment is to use it for storing music recordings with the music score or chord charts as an image in the image component (102 in FIG. 1) and the lyrics, in text file format, as a data component (106 in FIG. 1). If one needs to refer to the lyrics, they are conveniently located in the same file displaying the music score or chord charts. An audio file of the music recording may also be appended as a data component (106 in FIG. 1) to the image component (102 in FIG. 1).

Furthermore, the data file (100 in FIG. 1) of the example embodiment may be used as an ebook file with the cover page of the ebook being the image in the image component (102 in FIG. 1) and the text and graphics contents being data components (106 in FIG. 1) appended to the image component (102 in FIG. 1). In this manner, since the data file (100 in FIG. 1) is a single file, websites selling ebooks do not need to maintain a separate image file for showcasing a graphic illustration of the ebook on the website. The contents of the ebook can be accessed using the file reader application described earlier with reference to FIG. 6.

Moreover, the data file (100 in FIG. 1) of the example embodiment may be used to store a photograph of a person as the image in the image component (102 in FIG. 1). Data about the person can be appended as one or more data components (106 in FIG. 1) to the image component (102 in FIG. 1). Advantageously, common image viewers could display the person's photograph as the image component (102 in FIG. 1) is in the popular JPEG format. Data about the person can be accessed conveniently using the file reader application described earlier with reference to FIG. 6.

It has been observed that certain file browsers would extract the first frame of a video file and display it as a thumbnail representative of the contents of the video file. Many times the first video frame is meaningless and not representative of the contents in the video file. If the data file (100 in FIG. 1) of the example embodiment is used, one would be able to select a frame or image that is a better representation of the contents of the particular video to be stored in the image component (102 in FIG. 1) for display. Furthermore, the main video can be appended as a first data component (106 in FIG. 1) to the image component (102 in FIG. 1) and other secondary, commentary or related videos can be further appended as data components (106 in FIG. 1) to the first data component (106 in FIG. 1). All the related files of the video thus conveniently reside in just one single file.

The data file (100 in FIG. 1) of the example embodiment can also be used to make instant messaging applications more efficient. For instance, the profile picture of a user could be stored as the image in the image component (102 in FIG. 1) and the conversation log(s) could be stored as data components (106 in FIG. 1). This is better than having the profile picture and the conversation logs stored as separate files in different folders. Also, having the profile picture displayed makes it easier to identify which conversation log(s) belongs to which person.

Another application for the data file (100 in FIG. 1) of the example embodiment could be to use it for storing a calendar for one year as an image in the image component (102 in FIG. 1). In this case, the complete calendar acts as a "cover page". The monthly calendars could be appended to the image component (102 in FIG. 1) as data components (106 in FIG. 1) and could be conveniently extracted or read using the file reader application described earlier with reference to FIG. 6. Such a file structure would be useful for organizer related software applications. It is appreciated that in another example embodiment, the image in the image component (102 in FIG. 1) could be the calendar of the current month of a year and the data components (106 in FIG. 1) would contain images of the calendars of the other months of the year. When a month is over, with the aid of appropriate software, the image in the image component (102 in FIG. 1) could be updated with an image of the following month from the data components (106 in FIG. 1) by applying the steps for reordering as described with reference to FIG. 9. In this manner, the current month could be advantageously displayed by any JPEG viewer. In addition, a further application for the data file (100 in FIG. 1) of the example embodiment is to use it to store scientific information and related documentation. The image component (102 in FIG. 1) may store an image of a particular animal species and the information about the species could be appended as data components (106 in FIG. 1) in text, video, image and/or audio formats to the image component (102 in FIG. 1).

Some advantages of the data file (100 in FIG. 1) of the example embodiment described with reference to FIGS. 1 to 9 are described as follow.

The data file (100 in FIG. 1) of the example embodiment has an image component (102 in FIG. 1) that is readable by all JPEG image viewers. Therefore, there is present an easily accessible JPEG image representing the data file (100 in FIG. 1).

Advantageously, the one or more tags (226 in FIG. 2) in the data file (100 in FIG. 1) associated with the data components (106 in FIG. 1) (which may be individual files) are separated from the data components (106 in FIG. 1), thereby enabling addition of tags (226 in FIG. 2) without modifying the data components (106 in FIG. 1).

Also, advantageously, the data file (100 in FIG. 1) groups together and stores related data, including text, video, audio and image in a single file, thereby making file handling significantly easier and much more organised.

Furthermore, compared to other file formats, the data file (100 in FIG. 1) advantageously contains defined information types (defined through the tags 226 in FIG. 2), e.g. images, technical design drawings, vector graphics data, music recordings, music scores, chord charts, lyrics, ebooks, data about persons, videos, instant messaging logs, scientific information, etc, whereas other file formats such as TIFF allows information types other than images to be stored in the file but does not define any of them.

Although it is specified in the JPEG specification that the APP9 segment (200 in FIG. 2) has a 64 KB limit, effectively, the data file (100 in FIG. 1) does not have a maximum file size limit because the 64 KB is more than sufficient to define very large sizes of data components (106 in FIG. 1) in the data file (100 in FIG. 1). In contrast, a file format such as TIFF only has a 4 Gigabytes file size limitation.

It is appreciated that in another example embodiment, if the original data of the one or more data components (106 in FIG. 1) are similar to the data of the image in the image component (102 in FIG. 1), only data relating to the difference between the image in the image component (102 in FIG. 1) and the original data of the data components (106 in FIG. 1) is stored as the data components (106 in FIG. 1). In this case, the file size of the data file (100 in FIG. 1) could be significantly reduced. Similarly, if the original data of a first data component (106 in FIG. 1) is similar to the original data of a second data component (106 in FIG. 1), data relating to the difference between the original data of both the first and the second data components (106 in FIG. 1) could be stored as the data of the first or the second data component (106 in FIG. 1).

It is appreciated that the file reader application, the file creation application and the file editing application described above with reference to FIGS. 3 to 9 could be parts of a Graphics User Interface (GUI) (which can be called generally as a 'file reader') adapted to perform at least one of the following operations:

- include a data component (106 in FIG. 1) into the data file (100 in FIG. 1)
- extract a data component (106 in FIG. 1) from the data file (100 in FIG. 1)
- read a data component (106 in FIG. 1) in the data file (100 in FIG. 1)
- read the image component (102 in FIG. 1)
- remove the data component (106 in FIG. 1)

reorder the sequence of the data component (106 in FIG. 1)

duplicate a data component (106 in FIG. 1)

move a data component (106 in FIG. 1) of one data file (100 in FIG. 1) to another data file (100 in FIG. 1)

create one or more Tags (226 in FIG. 2) for a data component (106 in FIG. 1)

get number of data components (106 in FIG. 1) appended to a data file (100 in FIG. 1)

display all tag type identifiers (230 in FIG. 2) in the GUI as text strings. These text strings can be retrieved from the corresponding tag name fields (232 in FIG. 2)

It is appreciated that the JPEG standard is selected for illustration in the present specification because it advantageously contains the Application data syntax, which allows users to include their own proprietary data. In the example embodiment described herein, the proprietary data refers to the $APP_9$ segment (200 in FIG. 2).

It is appreciated that other image file formats having syntax that allows addition of proprietary data would also be appropriate for use as the image component (102 in FIG. 1) in example embodiments of the present invention. For instance, the Graphics Interchange Format (GIF) (GIF89a version), the TIFF format (TIFF Revision 6.0 Specification), Portable Network Graphics (PNG) [ISO/IEC 15948:2003 (E)], and the like.

A GIF (GIF89a version) file contains an application extension segment, which allows addition of proprietary data. The application extension segment includes an 8 bytes long identifier field and a 3 bytes long authentication code field. These two fields could be used to contain the signature field (206 in FIG. 2) and version field (208 in FIG. 2) of the example embodiment described earlier with reference to FIG. 2. Furthermore, the application extension segment contains an application data segment. It is appreciated that the application data segment could be used to contain the Number of components field (210 in FIG. 2) and the one or more tag lists (212 in FIG. 2) described earlier with reference to FIG. 2. Similarly, one or more data components (106 in FIG. 1) could be appended to the GIF (GIF89a version) file. Moreover, it is noted that the application extension segment terminates with a terminator, i.e. a null or zero character. Hence, it is necessary to replace any data having null or zero characters existing prior to the terminator with another representation for null or zero so as not to confuse a GIF file reader. It is appreciated that the methods herein described for creating and manipulating the data file (100 in FIG. 1) based on the JPEG file format could be similarly applied for the GIF (GIF89a version) file format.

A TIFF file contains one or more Image File Directory (IFD), which allows addition of proprietary data. The IFD includes a Tag field. The Tag field contains a Data offset field, which is a pointer for pointing to proprietary data contained in the file. It is appreciated that the proprietary data could contain the signature field (206 in FIG. 2), version field (208 in FIG. 2), Number of components field (210 in FIG. 2) and the one or more tag lists (212 in FIG. 2) described earlier with reference to FIG. 2. Similarly, one or more data components (106 in FIG. 1) could be appended to the TIFF file. It is noted that the size of a TIFF file has about 4 GB size limit and this would be a limitation on the number of data components the TIFF file could contain. It is appreciated that the methods herein described for creating and manipulating the data file (100 in FIG. 1) based on the JPEG file format could be similarly applied for the TIFF file format.

With regard to PNG file format, there is a Chunk type (gIFx) segment that allows addition of proprietary data. The Chunk type (gIFx) segment includes a GIF application extension segment. The GIF application extension segment in turn contains a data segment. The data segment includes an 8 bytes long Application Identifier (ID) field and a 3 bytes long authentication code field. These two fields could be used to contain the signature field (206 in FIG. 2) and version field (208 in FIG. 2) of the example embodiment described earlier with reference to FIG. 2. Furthermore, the data segment contains an application data segment. It is appreciated that the application data segment could be used to contain the Number of components field (210 in FIG. 2) and the one or more tag lists (212 in FIG. 2) described earlier with reference to FIG. 2. Similarly, one or more data components (106 in FIG. 1) could be appended to the PNG file. It is appreciated that the methods herein described for creating and manipulating the data file (100 in FIG. 1) based on the JPEG file format could be similarly applied for the PNG file format.

Many modifications and other embodiments can be made to the data file (100 in FIG. 1) and the methodologies herein described by those skilled in the art having the understanding of the above described disclosure together with the drawings. Therefore, it is to be understood that the data file (100 in FIG. 1) and its utility is not to be limited to the above description contained herein only, and that possible modifications are to be included in the claims of the disclosure.

What is claimed is:

1. A data file having more than one mode of operation, the data file comprising:

an image component for storing an image as a representation of the data file, the image component being associable with an image file format readily readable by an image viewer; and one or more data components unreadable by the image viewer being appended to the image component in a manner such that the one or more data components and the image component are readable by a file reader, the image component comprising metadata associated with the one or more data components, syntax of the data file being based on at least the image component and the one or more data components appended thereto, the file reader capable of discerning syntax of the data file wherein in a first mode of operation, the image component of the data file is readable for viewing the image by the image viewer while the image component is part of the data file, and in a second mode of operation, the image component and the one or more appended data components are readable by the file reader.

2. The data file as claimed in claim 1, wherein the image component is based on JPEG file format, GIF (GIF89a version) file format, TIFF file format or PNG file format and is viewable by a corresponding image viewer.

3. The data file as claimed in claim 1, the data file further comprising:

an application segment, the application segment comprising:

a Signature field for containing a signature to distinguish the application segment from other application segments that is present in the image component.

4. The data file as claimed in claim 3, wherein the application segment further comprising:

a version field for indicating version of technical standard applicable to the application segment.

5. The data file as claimed in claim 1, the data file further comprising:

a content checker for verifying data integrity of the one or more data components.

17

6. The data file as claimed in claim 1, wherein the metadata comprising:
one or more tags, each tag comprising:
a tag type identifier for indicating type of the tag; and
a tag name field comprising text data describing the type of the tag.

7. The data file as claimed in claim 1, wherein the one or more data components being image data, text data, audio data or video data.

8. The data file as claimed in claim 1, wherein each data component comprising:
data of difference between data of the image stored in the image component and original data of the data component.

9. The data file as claimed in claim 1, wherein each data component comprising:
data of difference between original data of two of the one or more data components.

10. The data file as claimed in claim 1, wherein one or more of the data components comprising:
data of the history of changes made to the image stored in the image component.

11. The data file as claimed in claim 1, the image being a stitched Panorama photograph and the one or more data components comprising pre-stitched snapshots of different portions of the stitched Panorama photograph.

12. The data file as claimed in claim 1, the image being a generated HDR photograph and the one or more data components comprising photographs taken with different exposure rates that are used for generating the HDR photograph.

13. The data file as claimed in claim 1, the image being a rasterised image and the one or more data components comprising vector graphics information.

14. The data file as claimed in claim 1, wherein the image for storing as the representation of the data file is user selectable.

15. The data file as claimed in claim 1, wherein the metadata comprising metadata associated with the image component.

16. A method for creating a data file having more than one modes of operation, the method comprising:
selecting an image;
storing the selected image as a representation of the data file in an image component of the data file, the image component being associable with an image file format readily readable by an image viewer;
creating metadata associated with the one or more data components, the one or more data components being unreadable by the image viewer;
incorporating the metadata into the image component; and
appending one or more data components to the image component incorporating the metadata to form the data file in a manner such that the one or more data components and the image component are readable by a file reader, syntax of the data file being based on at least the image component and the one or more data components appended thereto, the file reader capable of discerning syntax of the data file,
wherein in a first mode of operation of the data file, the image component is readable for viewing the selected image by the image viewer while the image component is part of the data file,

18 in a second mode of operation of the data file, the image component and the one or more appended data components are readable by the file reader.

17. The method as claimed in claim 16, wherein the image component is based on JPEG file format, GIF (GIF89a version) file format, TIFF file format or PNG file format and is readable by a corresponding file reader.

18. The method as claimed in claim 16, wherein the step of storing the selected image as a representation of the data file in an image component of the data file comprising:
creating an image file as the image component of the data file from the selected image.

19. The method as claimed in claim 18, wherein the step of incorporating the metadata into the image component comprising:
reading data in the image file for placing before the metadata and writing the read data for placing before the metadata to a new file;
reading data in the image file for placing after the metadata and writing the read data for placing after the metadata to the new file; and
incorporating the constructed metadata into the new file.

20. The method as claimed in claim 16, wherein the step of storing the selected image as a representation of the data file in an image component of the data file comprising:
creating an image file with an allocated data space as the image component of the data file from the selected image.

21. The method as claimed in claim 20, wherein the step of incorporating the metadata into the image component comprising:
inserting the metadata into the allocated data space of the image file.

22. A method for reading a data file having more than one modes of operation, the data file comprising:
an image component for storing an image as a representation of the data file, the image component being associable with an image file format readily readable by an image viewer which is operable to electronically display the image component; and
one or more data components unreadable by the image viewer being appended to the image component in a manner such that the one or more data components and the image component are readable by a file reader, the file reader being capable of discerning syntax of the data file associable with the one or more appended data components, syntax of the data file being based on at least the image component and the one or more data components appended thereto, the file reader capable of discerning syntax of the data file,
the image component comprising metadata associated with the one or more data components,
wherein in a first mode of operation, the image component is read by the image viewer to view the image stored in the image component of the data file; and
wherein in a second mode of operation, the image component and the one or more of the appended data components of the data file are readable by the file reader.

23. The method as in claim 22, wherein in the first mode of operation, the image component is capable of being read by the image viewer to view the image stored in the image component of the data file without having to remove the one or more appended data components.

* * * * *